United States Patent [19]

Ito et al.

[11] 3,937,594

[45] Feb. 10, 1976

[54] OBJECT DISPOSED IN A FLUID FLOW AND HAVING A SELECTED CONFIGURATION TO MINIMIZE GENERATION OF KARMAN'S VORTEX STREET

[75] Inventors: Hideo Ito; Mizuho Tanaka; Harumasa Sato, all of Hitachi, Japan

[73] Assignee: Hitachi, Ltd., Japan

[22] Filed: Apr. 23, 1974

[21] Appl. No.: 463,430

[30] Foreign Application Priority Data
Apr. 27, 1973 Japan.............................. 48-47258

[52] U.S. Cl............................ 416/223 A; 244/35 R
[51] Int. Cl.².......................... B64C 3/14; F01D 5/14
[58] Field of Search........ 244/34 R, 35 R, 37, 40 A, 244/41; 416/223; 14/22

[56] References Cited
UNITED STATES PATENTS

| | | | |
|---|---|---|---|
| 2,441,151 | 5/1958 | Jones | 244/35 R |
| 2,597,510 | 5/1952 | McBride | 415/DIG. 1 |
| 3,347,520 | 10/1967 | Owczarek | 416/223 |

Primary Examiner—Everette A. Powell, Jr.
Assistant Examiner—L. J. Casaregola
Attorney, Agent, or Firm—Craig & Antonelli

[57] ABSTRACT

An object disposed in a fluid flow and defined by two surfaces, each extending along a stream line and one of said two surfaces having a reference contour. To eliminate the danger that a violent oscillation is generated due to resonance between the natural oscillation of the object and the oscillation caused by Karman's vortex which develops at the downstream end portion of the object, said downstream end portion of the object is so formed as to provide a configuration satisfying the following relations:

$$R1/TV \leqslant 0.2 \text{ and } R2/TV = 6{-}10$$

where, $R1$ is a radius of curvature of the first portion of object's downstream end portion which is continuous with said reference surface, $R2$ is a radius of curvature of the second portion of object's downstream end portion extending between said first portion and the other surface, and $TV$ is the minimum thickness of the object between said two surfaces measured from the joining point or juncture between said second portion and the other surface.

5 Claims, 4 Drawing Figures

OBJECT DISPOSED IN A FLUID FLOW AND HAVING A SELECTED CONFIGURATION TO MINIMIZE GENERATION OF KARMAN'S VORTEX STREET

This invention relates to an object disposed in fluid flow such as, for example, a runner blade and guide vane for water turbine and, more particularly, to improvements in the configuration of the downstream end portion of such object to minimize the oscillation generated in the object by Karman's vortex street.

An object or objects to be disposed in a moving fluid such as water, air or oil may be arranged along a stream line or formed to a stream line shape to minimize their resistance against the fluid flow or otherwise, depending on the purpose, they may be so arranged or formed as to resist against the fluid flow.

When an object is disposed in a fluid flow, a low pressure region is formed in the fluid close to the downstream end portion of the object and hence a portion of the fluid flowing along the surface of the object is sucked into the low pressure region. At this time the portion of fluid changes its flowing direction, developing a so-called Karman's vortex street. The aforesaid low pressure region, upon sucking the fluid, temporalily reaches a normal or higher pressure level and then drops again to a low pressure level, thereby sucking the fluid and developing a new Karman's vortex street. These are repeated so long as the object is disposed in the fluid flow.

The manner, in which Karman's vortex street is generated varies depending on the various conditions such as the size and arrangement of the object(s), the configuration of object's downstream end portion, and pressure, flow rate, etc. of the fluid. It is known that if the downstream end portion of the object has a symmetrical configuration with two surfaces, each extending along a stream line, then Karman's vortex streets will develop periodically and those developed at the symmetrical positions on said two surfaces will have an equal strength. Under these conditions, the repeating pressure change in the fluid due to such Karman's vortex street will be applied to the object as an external force. When the period at which said external force is applied to the object coincides with the natural oscillation of the object, then the object will be subjected to an increased oscillation having a great influence over the object itself and the machine supporting the same.

Oscillation of the object develops depending on the combination of various conditions as mentioned previously, and for some purposes no provision will be required to eliminate such oscillation. However, in case of an object such as runner blade or guide vane for water turbine where the fluid flows in a constant direction and the arrangement thereof within the fluid is predetermined, it is desired to minimize the oscillation which is generated in the object by the action of Karman's vortex street.

As mentioned previously the manner in which Karman's vortex street develops varies depending especially on the configuration of the downstream end portion of the object. It is appreciated therefore that, to prevent the generation of object's oscillation, the generation of Karman's vortex street should be avoided or otherwise the downstream end portion of the object should be selected to have such a configuration as to develop Karman's vortex streets asymmetrically and irregularly so that the period of vortex generation does not coincide with the natural oscillation of the object.

A known runner blade for water turbine has a downstream end portion defined by a reference surface and another surface extending at an angle of 30°–45° to the reference surface. With this configuration, Karman's vortex street cannot be eliminated completely but noise and oscillation are often developed by the action of Karman's vortex street. Besides, to obtain a good effects with this configuration, the radius of curvature of the downstream end portion must be selected sufficiently small, reducing the thickness and strength of the downstream end portion of the runner blade. Since the asymmetrical angle of the downstream end portion is selected to be as large as 30°–45°, the fluid flow is liable to be separated from the surface of the object at its downstream end portion so that cavitations are often developed.

This invention relates to an object disposed in a fluid flow and having a selected configuration to minimize the oscillation which is generated by Karman's vortex street developed at the downstream end portion of the object disposed in a moving fluid. The object is defined by two surfaces, one of which is a reference surface. The downstream end portion of the object has a suitable configuration by suitably selecting three factors R1, R2 and TV, that is, a radius of curvature R1 of the first portion of object's downstream end portion which is continuous with said reference surface, a radius of curvature R2 of the second portion of object's downstream end portion extending between said first portion and the other surface, and the minimum thickness TV of the object between said two surfaces measured from the joining point between said second portion and the other surface.

Figure 1:
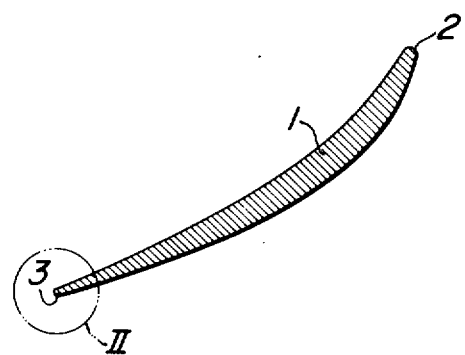
FIG. 1 is a longitudinal section of a runner blade for water turbine to be disposed in water.
Figure 2:
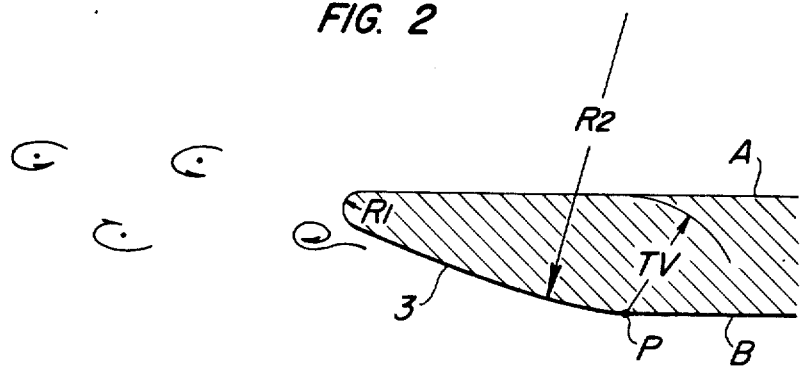
FIG. 2 is a detailed sectional view of the outflowing end portion of the runner blade shown in FIG. 2.

A runner blade 1 for water turbine according to one embodiment of this invention is defined by two surfaces A and B. When viewed in a longitudinal cross section as in FIG. 1, each of said surfaces A and B is a complicated combination of various curves extending along a stream line. The configuration of an outflowing end portion 3 of the runner blade 1 is so selected as to satisfy the following relations:

R1/TV ≦ 0.2 and R2/TV = 6–10 where, R1 is a radius of curvature of the first portion ofthe outflowing end portion 3 which is continuous with the reference surface A, R2 is a radius of curvature of the second portion of the outflowing end portion 3 extending between said first portion and surface B, and TV is the shortest distance between the surface A and B measured from the joining point P of said second portion with the surface B (or the minimum thickness of the runner blade 1 measured from said joining point P).

Figure 3:
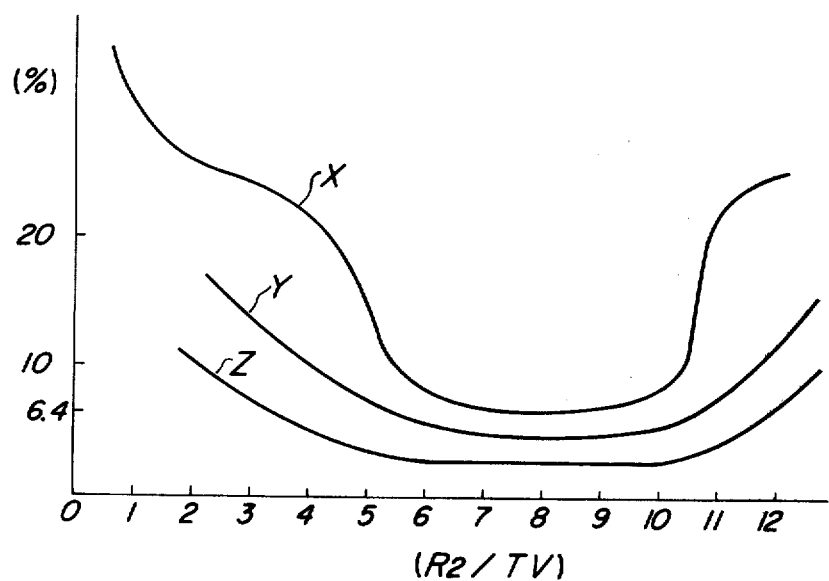
FIG. 3 is a graph explaining how the oscillation varies with the variation in the configuration of the outflowing end portion of the runner blade of FIG. 1.

The graph of FIG. 3 is to explain how the runner blade oscillation varies with the variation in said radii of curvature R1, R2 and the thickness of the runner blade 1 and including three curves X, Y and Z, each being plotted in percentage with respect to the oscillation generated in the runner blade having an outflowing end portion of a perfectly rectangular configuration. The curve X is obtained from the runner blade 1 satisfying the relation of R1/TV = 0.2, and having a minimum oscillation of about 6.4%; the curve Y is obtained from the runner blade 1 satisfying the relation of R1/TV = 0.19, and having a minimum oscillation of about 4.9%; and the curve Z is obtained from the runner blade 1 satisfying the relation of R1/TV = 0.18, and having a minimum oscillation of about 2.5%.

Experiments have shown that the runner blade 1 having a minimum oscillation less than about 10% of the blade with a rectangular outflowing end portion can be used in an ordinary water turbine. This means that no difficulty is encountered in application of the runner blade 1 according to this invention to a practical water turbine so long as the runner blade 1 satisfies a relation of R1/TV $\leq$ 0.2 within the range of R2/TV = 6 – 10.

The second portion having a radius of curvature of R2 may include a straight portion extending intermediately thereof, without giving any perceptible influence over the generation of Karman's vortex street and resonance phenomenon of the runner blade 1.

Figure 4:
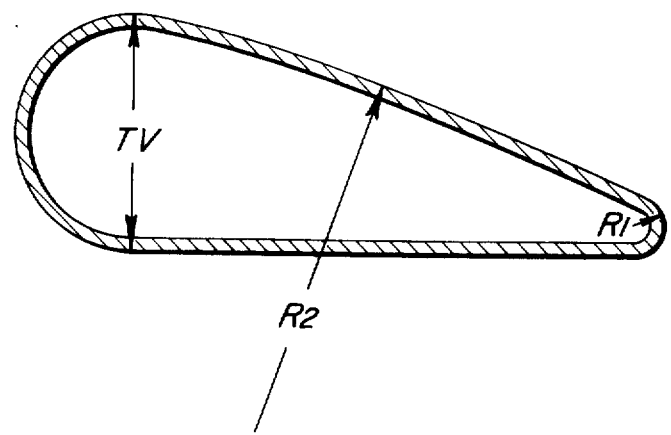
FIG. 4 is a sectional view of a cooling pipe according to an embodiment of this invention, the cooling pipe being so designed as to be disposed in a moving oil.

Illustrated in FIG. 4 is a hollow cooling pipe according to an embodiment of this invention which is disposed, for example, in an oil. For use in a heated oil an oscillation-free cooling pipe may be so constructed as to have radii of curvature R1, R2 and the thickness TV (see FIG. 4) satisfying the relation mentioned previously.

What is claimed is:

1. A fluid foil section having a selected configuration to minimize the generation of Karman's vortex street when disposed in a moving fluid and is defined by two surfaces, each extending along a stream line and one of said two surfaces forming a reference surface, said foil section being characterized by a selected configuration satisfying the following relations:

R1/TV $\leq$ 0.2 and R2/TV is in the range of 6–10 where, R1 is a radius of curvature of a trailing edge portion of the foil section's downstream end portion which is continuous with said reference surface, R2 is a radius of curvature of a second portion of the foil section's downstream end portion extending between said trailing edge portion and the other surface of the foil section, and TV is a minimum thickness of the foil section between said two surfaces measured from the joining point between said second portion and the other surface.

2. A runner blade for a water turbine defined by two surfaces, one of which surfaces is a reference surface having a reference contour, the runner blade is characterized by a selected configuration satisfying the following relations:

R1/TV $\leq$ 0.2 and R2/TV is in the range of 6–10 where, R1 is a radius of curvature of the trailing edge portion of the blade's downstream end portion which is continuous with said reference surface, R2 is a radius of curvature of a second portion of the blade's downstream end portion extending between said trailing edge portion and the other surface, and TV is the minimum thickness of the blade between said two surfaces measured from the joining point between said second portion and the other surface.

3. A fluid foil section according to claim 1, wherein R1/TV is in the range of 0.18 to 0.20.

4. A fluid foil section according to claim 1, wherein said foil section is a hollow cooling pipe.

5. A blade according to claim 2, wherein R1/TV is in the range of 0.18 to 0.20.

* * * * *